July 1, 1958 — M. C. MAGARIAN — 2,841,067
HITCH STRUCTURES
Filed Dec. 7, 1954 — 2 Sheets-Sheet 1

MASICK C. MAGARIAN
INVENTOR

HUEBNER, BEEHLER,
WORREL & HERZIG
ATTORNEYS

BY Richard M. Worrel

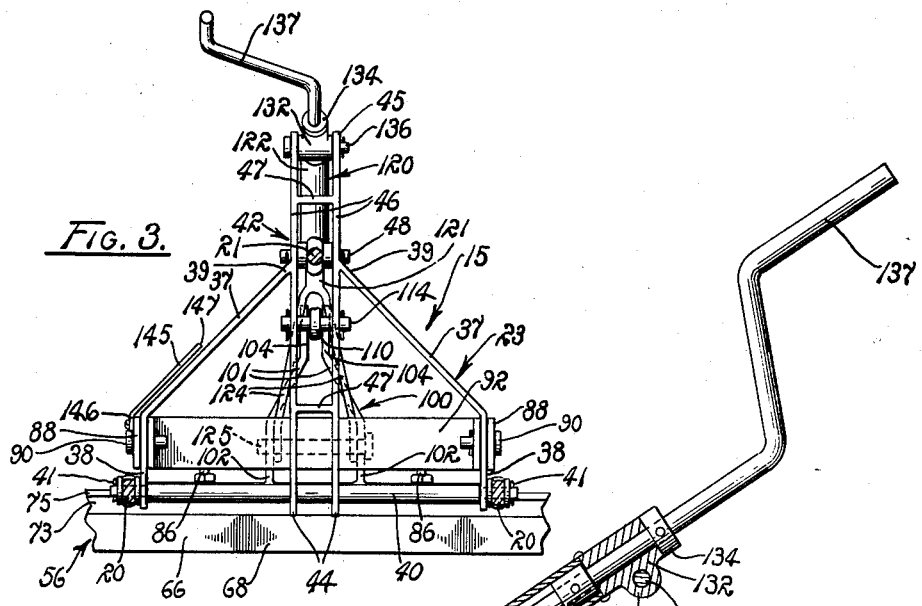

United States Patent Office 2,841,067
Patented July 1, 1958

2,841,067

HITCH STRUCTURES

Masick C. Magarian, Fresno, Calif.

Application December 7, 1954, Serial No. 473,716

5 Claims. (Cl. 97—46.07)

The present invention relates to coupling or hitch structures and more particularly to such structures adapted to control the tractive force applied by a prime mover, such as a driven implement, to a drawn implement, such as a disk harrow.

Although the problems encountered and effectively solved by this invention are conveniently described in connection with tractor motivated agricultural implements, it will be understood that the improved coupling is not limited to such an environment.

It has been found that implements attached to tractors by presently available hitches sometimes fail to penetrate sufficiently deeply into hard or crusty soil and tend to dig too deeply into soft soil. Obviously, this results in variably effective work, insufficient cultivation in hard soil and in excessive drag in soft soil. Unfortunately, known hitch structures fail to control this undesirable action of attached implements and in fact, many conventional hitches tend further to aggravate the conditions described.

Experimentation has shown that this condition can be controlled and counteracted by regulating the application of the draft force applied by the tractor through the coupling or hitch structure to the implement. This is understood by resolving the draft forces into both horizontal and vertical components whereby some of the draft force is utilized to control elevational movements of implement in various soils. Where the draft force is applied through elevationally fixed draft arms, a similar result is accomplished by imposition of the weight of the tractor on the implement in hard soils and relief of such weight in soft soils.

An apparatus for accomplishing the same general purpose as the present invention is shown in my co-pending application entitled "Harrow Hitch," Serial No. 423,319, filed April 15, 1954. My prior application, in brief, provides a hitch structure for elevationally positioning the connection between the lift arms of the hydraulic power lift system and the hitch structure referred to therein as the pulling point. This is done by extending or contracting a tie rod connected in triangular relation between the A-frame and the point of connection of the hitch to the implement frame. An additional telescopic rod is used to reposition the implement in a horizontal plane subsequent to positioning of the pulling point and to maintain the implement in such an attitude during earth traversing movement.

In contrast with my prior disclosed invention, as briefly reviewed above, the present invention functions automatically, incident to elevational adjustment of the pivotal connection between the tractor or other prime mover and the hitch structure, to position and maintain the implement in desired attitude.

Therefore, an object of this invention is to provide improvements in hitch structures of the character described.

Another object is to counteract undesirable elevational movements of draft implements incident to variations in soil character and the like.

Another object is to provide a hitch structure for connecting a draft implement to a prime mover which permits application of the draft force so as to have an elevational regulating component of force.

Another object is to provide a hitch structure adapted to connect a draft implement to a prime mover and which permits elevational control of the point of connection of the prime mover to the hitch structure.

Another object is to provide a hitch structure adapted for connecting a ganged implement to a tractor by way of a three-point attachment in power lift mechanisms which is further adapted elevationally to adjust the position of the connection between the hitch structure and the lower two points of the three-point attachment to enable a vertical component of the draft force to be imparted to the implement controllably to impose and relieve the weight of the tractor on and from the implement through the hitch structure.

Another object is to enable automatic positioning and maintenance of an implement in desired attitude incident to elevational movement of the connection between a hitch structure and prime mover of the nature described.

Another object is to provide a hitch structure which is automatically operable, easily adjusted, adaptable to many implements and/or prime movers, dependable in action and thoroughly effective for its intended purposes.

These and other objects will be more fully apparent on reference to the following description.

In the drawings:

Fig. 3 is a transverse elevation taken on a vertical plane at a position represented by line 3—3 of Fig. 2.

Fig. 4 is a somewhat enlarged fragmentary sectional detail view of the tie rod utilized in the present invention.

Fig. 5 is a diagrammatic representation of a hitch constructed in accordance with the principles of the present invention and illustrating, in particular, the forward tractive or draft force and the components thereof as applied to the hitch.

Fig. 6 is a view similar to Fig. 5 but illustrating the forces in action when the hitch is in a different position.

Figure 1:
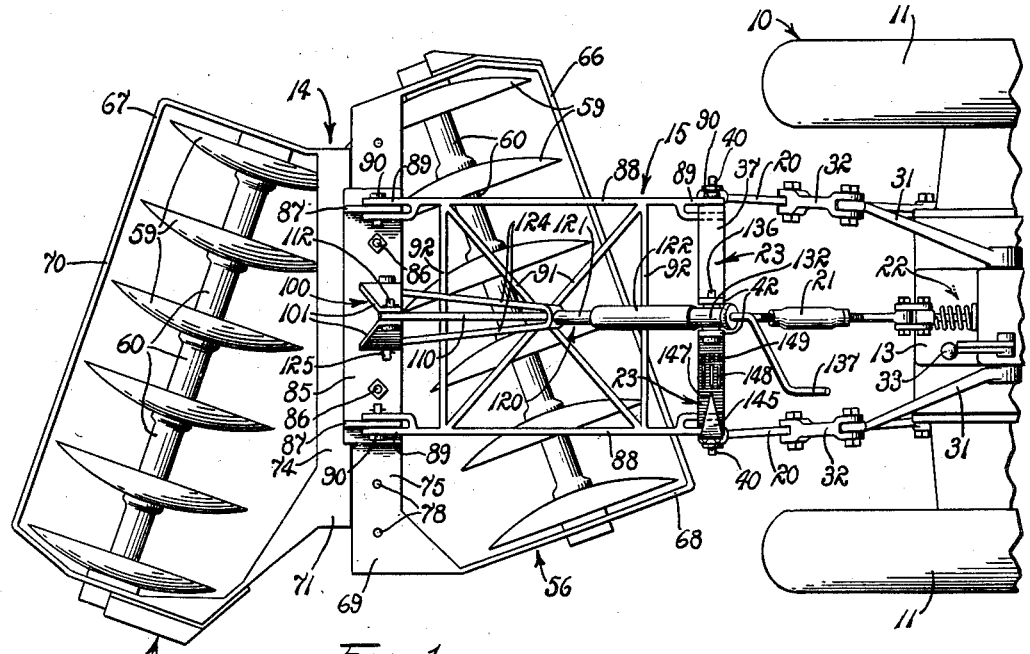
Fig. 1 is a fragmentary top plan view showing the present invention in association with a tractor and an earth working implement.
Figure 2:
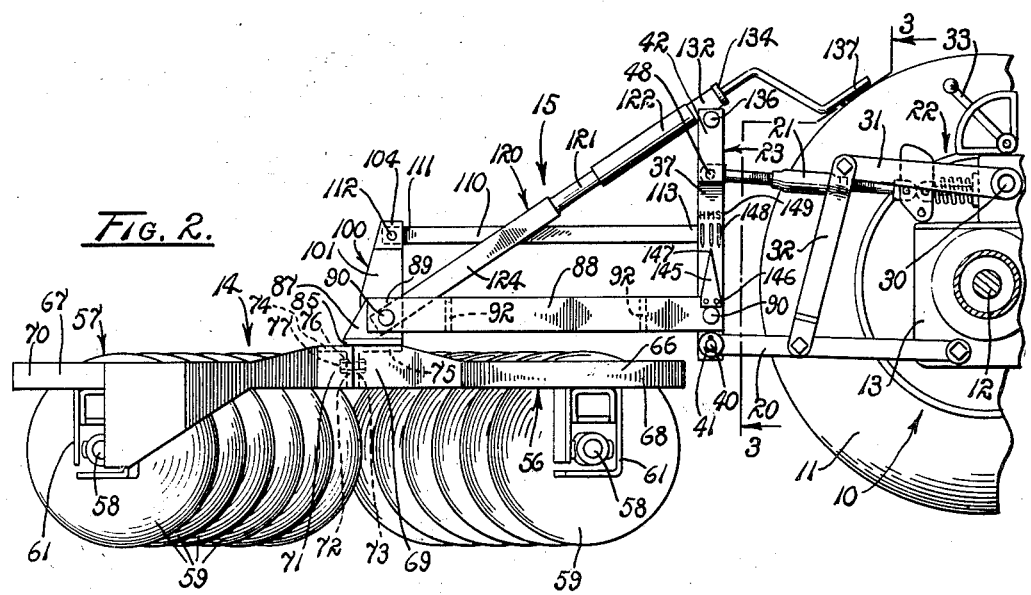
Fig. 2 is a side view of the invention as shown in Fig. 1.

Referring to the drawings in greater detail:

A tractor 10 is shown in Figs. 1 and 2 having a pair of rear drive wheels 11 rotatably mounted on a rear axle 12 and providing a transmission housing 13. An implement 14 is connected to the tractor by a hitch structure, generally indicated at 15.

A pair of rearwardly directed lift or pulling arms 20 are pivotally mounted on the transmission housing 13 and an upper link 21 pivotally extends from a control system or hydraulic power unit, indicated at 22. A forward A-frame 23 constituting a lift frame is borne in a substantially erect position by the rearwardly extended ends of the lift arm 20 and is pivotally connected to the upper link 21.

The control system 22 utilized with the present invention is of conventional form and is described at this point merely to enable a better understanding of the environment and operation of the present invention. Accordingly, a rock shaft 30 is rotatably mounted transversely of the tractor 10 in the transmission housing 13. Radius arms 31 are radially extended from opposite ends of the rock shaft in elevationally spaced relation to the lift arms 20. Elevating rods 32 are provided and pivotally interconnect the radially extended ends of the radius arms with their respective lift arms. The hydraulic lift mechanism is elevationally adjusted by hand lever 33.

The forward A-frame 23 includes a pair of downwardly divergent side arms 37 having dependent substantially parallel lugs 38 and upper ends 39. A shaft 40 is extended between the lugs of the A-frame and is pivotally attached to the rearwardly extended ends of the lift arms 20. Cotter pins 41 are provided for maintaining the lift arms in connected relation on the shaft 40. A central vertically disposed beam 42 constituting the spinal portion of the A-frame is connected to the arms 37 at the upper ends thereof, as by welding or the like. The central beam provides a lower end 44 pivotally connected to the shaft 40 and an upper end or top portion 45. The beam is conveniently constructed of a pair of spaced parallel bars 46 interconnected by a plurality of vertically spaced webs 47. A pin 48 is extended between the bars 46 immediately above the connection of the beam to the arm 38 and is journaled to the upper link 21.

The implement 14 provides oppositely disposed angulated forward and rearward gangs 56 and 57, each of which is similarly constructed and thus, like parts are indicated by similar numerals. Each gang provides a shaft 58 mounting a plurality of longitudinally spaced, substantially parallel, concavo-convex discs 59 constituting earth working tools usable in harrowing and other cultivating operations. A plurality of spacer sleeves 60 are mounted on the shafts 58 for maintaining proper spaced relation between the discs. In addition, brackets 61 are connected to the outer ends of the shafts 58.

Forward and rearward frames 66 and 67, respectively, are provided for the forward and rearward gangs 56 and 57, respectively and for this purpose are attached to the gangs by means of the brackets 61. The forward frame provides a forward somewhat U-shaped section 68 and a central section 69, said sections preferably being integrally connected and substantially circumscribing the forward gang 56. Likewise, the rearward frame provides a rearward somewhat U-shaped section 70 and a central section 71 which are also preferably integrally connected in circumscribing relation to the rearward gang 57. The central sections, respectively, of the rearward and forward frames provide vertical flanges 72 and 73 and horizontal flanges 74 and 75. The vertical flanges are disposed in substantially flush relation and provide a plurality of aligned holes, as 76, through which are extended fastening bolts 77 for joining the forward and rearward frames together. When mounted in this manner, the frames are rigidly interconnected with the gangs in predetermined horizontal angular relation, as will be apparent. Further, the horizontal flange 75 on the forward frame 66 is provided with a plurality of holes 78.

A bracket plate 85 provides a horizontal portion securely fastened on the horizontal flange 75 of forward frame 66 by bolts 86 extended through the holes 78 and provides a pair of spaced flanges or attachment ears 87 vertically upstanding therefrom. A pair of elongated draft arms 88 having forward and rearward bifurcated ends, or clevises, 89 are pivotally connected between the spaced flanges 87 and the dependent lugs 38 of the forward A-frame 23. For this purpose, pivot pins 90 are extended through the lugs 38 and the bifurcated ends 89 and between the spaced flanges and the bifurcated ends. A pair of cross braces 91 and a pair of transverse struts 92 are connected between the arms 88 for adding rigidity to the arms. The arms 88, cross braces 91 and transverse struts 92 form a cantilever frame.

A rear A-frame or post unit 100 constituting a gang attitude control member, is mounted rigidly in erect position on the bracket plate 85. The rear A-frame includes a pair of spaced arms 101 having lower mounting lugs 102 welded or otherwise secured to the bracket plate 85 and upwardly extended convergent connecting lugs 104.

An elongated, gang attitude control or connecting link or rod 110 provides a rear end 111 pivotally connected by a pivot pin 112 to the connecting lugs 104 of the rear A-frame and a forward end 113 pivotally connected by pin 114 between the spaced bars 46 of the forward A-frame 23. This link is mounted in vertically spaced, substantially parallel relation to the arms 88. Further, the pivotal connections of the link to the forward and rearward A-frames 23 and 100 respectively are spaced substantially the same as the pivotal connections of the arms to the flanges 87 and forward A-frame.

A parallelogram frame is formed by the forward and rearward A-frames 23 and 100, the arms 88 and the connecting link 110 with the four corners of such frame being defined by the pivotal connections between the A-frames, arms and connecting link, as will be apparent. Because the forward A-frame is constrained to move in a substantially vertical plane, within reasonable operating limits, the parallelogram frame constrains movement of the rearward frame to a substantially constant vertical attitude. Since the rearward A-frame is rigidly connected in right angular relation to the implement 14, the implement is maintained in substantially horizontal attitude during elevational skewing of the parallelogram frame.

An adjustable tie rod 120 is provided and includes inner and outer telescopic sleeves 121 and 122, respectively. The inner sleeve is provided with a plurality of internal threads 123 at one end thereof and is forked or birfurcated as at 124, at the other end thereof. The bifurcated end 124 is pivotally connected between the mounting lugs 102 of the rear A-frame 100 on a pin 125. It should be noted at this point that the pivot axes of the tie rod on the rear A-frame 100, the arms 88 on flanges 87 and ink 110 on the rear A-frame all lie in a common erect plane substantially perpendicular to the horizontal plane of the frames 66 and 67.

A control rod 130 is extended through the outer sleeve 122 and provides a plurality of external threads 131 adapted for threadable reception in the inner sleeve 121. A bushing 132 is fitted on the control rod and welded to the outer sleeve and collars 133 and 134 are attached to the control rod on opposite sides of the bushing to preclude axial movement of the rod. The bushing provides a laterally extended boss 135 and the tie rod is pivotally connected to the upper end 45 of the A-frame 23 between the spaced bars 46 by means of a pin 136 journalled in the boss. A crank handle 137 is integrally associated with the control rod 130 to enable extension or contraction of the tie rod 120 thereby upwardly or downwardly to skew the parallelogram frame. It is to be noted that the tie rod 120 pivotally interconnects the forward and rearward A-frames 23 and 100 diagonally or obliquely of the connecting link 110 and draft arms 88, or stated otherwise, diagonally or obliquely of the parallelogram frame.

The forward and rearward A-frames 23 and 100, the draft arms 88, the link 110, and the tie rod 120 also constitute an elevationally skewable frame pivotally connected to the harrow 14 and to the lift arms 20 wherein the tie rod acts as a means for adjustably skewing such frame to raise and to lower the pivotal connection represented by the shaft 40, and the link 110 acts as a means automatically operable during skewing of the frame to maintain the harrow in a predetermined attitude, that is, a horizontal attitude in the illustrated embodiment.

An indicating pointer 145 is secured to one of the arms 88 adjacent to the forward end thereof. The pointer is substantially triangularly shaped and provides an upper indicating apex 147. Suitable indicia 148 are provided on the adjacent arm 38 of the forward A-frame 23 and may conveniently consist of the words "Hard," "Medium," and "Soft," being representative of the various soil conditions to be encountered.

Operation

The operation of the device of this invention is believed to be readily apparent and is briefly summarized at this point.

Assuming that it is desired to cultivate in relatively hard or crusty soil, the crank handle 137 is rotated so as to extend the tie rod 120 by threading the inner sleeve 121 outwardly of the outer sleeve 122. The extent to which the tie rod is lengthened will depend upon the hardness of the soil being workedd.

After the tie rod 120 has been sufficiently elongated to attain the desired length, the hand lever 33 is moved to the upper position, as seen in Figs. 2, whereby the hydraulic control system 22 is effective to permit lowering of the radius arms 31 and lift arms 20. Inasmuch as the tie rod locks the parallelogram frame of the hitch structure in upwardly skewed relation, the lift and radius arms remain in their upper positions but because they are permitted to lower by reason of the adjustment of the control system 22, they are freed for elevational free floating movement.

The condition of the hitch structure 15 as above described is diagrammatically represented in Fig. 5 which is briefly alluded to at this point for a fuller understanding of the force relationships involved. The diagrammatic showing of the parallelogram frame members bears the same element identifying numerals as the actual members. It is to be noted that the pivotal connection between the forward A-frame 23 and the lift arms 20 conveniently referred to as the pulling point 158 in the diagrams, is above the pivotal connection between the lift arms and the tractor 10, conveniently referred to as the tractor connecting point 159. As the implement is moved forwardly by the tractor, the draft force, represented by the vector 160 in Fig. 5, lies along the downwardly angulated lift arms 20.

By applying the draft force to the pulling point along a downwardly directed line, the draft force is resolved into a horizontal forwardly directed force, represented by the vector 162, and a vertical downwardly directed force, represented by the vector 163. It will be quite apparent that the downward component of the draft force tends to urge the implement 14, through the rigid hitch structure 15, more deeply into the soil. This, of course, is precisely the effect desired and enables more effective cultivation in relatively hard soils.

When it is desired to work in relatively soft soils, the opposite adjustment of the device from that above described is made. Therefore, the crank handle 137 is rotated to contract the tire rod 120 so as to reduce its length. This moves the pulling point 158 downwardly from the position shown in Fig. 5. It will be understood that as the pulling point moves downwardly the magnitude of the downward component of force 163 is gradually decreased. When the pulling point and tractor connecting joint 59 lie in the same horizontal plane the downward component of the draft force disappears and all of the force is in a forward direction.

When the tie rod 120 has been shortened to such an extent that the pulling point 158 lies below the tractor connecting point 159, the forward draft force, represented by the vector 165 in Fig. 6, lies along an upwardly directed line defined by the lift arms. This draft force is resolved into a horizontal forwardly directed component, represented by the vector 166, and a vertical upwardly directed component, represented by the vector 167. It will be clear that the upward component of force 167 has the effect of lifting the implement 14 or at least resisting downward drag caused by working in soft soils.

The hitch structure 15 may also be adjusted for working in soils of medium hardness and it will be readily apparent from the foregoing description that such adjustments lie between the upper and lower limiting positions of the hitch structure as represented by the diagrammatic views in Figs. 5 and 6, respectively. It will be readily understood that the hitch structure 15 also has utility with an elevationally fixed draft connection. In such a case, extension and retraction of the tie rod 120, respectively, permits imposition of the weight of the tractor on the implement through the hitch or relieves such weight, even lifting the implement on the tractor, if required.

In practice it has been found that the principles embodied in the structure of the present invention have enabled far more efficient cultivation in soils of varying hardness or difficulty of penetration. Whereas hitch structures of the prior art have failed to penetrate deeply enough into hard soils and have caused excessive drag in soft soils, an implement attached to a prime mover by the hitch structure of the present invention is adjustable for precise depth control in a variety of soils. In addition, the provision of a parallelogram frame construction in the hitch enables automatic control of the implement attitude within reasonable elevational positioning of the pulling point 158.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desired to secure Letters Patent is:

1. A draft hitch for connecting an agricultural implement providing a substantially horizontal frame to a draft appliance having a forward direction of movement and a pair of rearwardly extended lift arms pivotally connected to the appliance for elevational pivotal movement, comprising a pair of elongated draft arms pivotally connected to the frame and forwardly extended therefrom, a substantially erect forward control frame having spaced dependent portions pivotally connected to the forwardly extended ends of the draft arms and a central portion providing upper and lower ends, means pivotally connecting the dependent portions of the control frame to the lift arms below the draft arms, a shaft extended between the dependent portions of the forward frame and journaled in the lower end of the central portion thereof, a substantially erect rear control frame rigidly connected to the implement frame intermediate the draft arms, a connecting link pivotally connected between the central portion of the forward control frame and the rear control frame in substantially parallel spaced relation to the draft arms, the pivotal connections of the link to the forward and rear frames being spaced substantially the same as the pivotal connections of the draft arms to the implement frame and the forward control frame, and a longitudinally adjustable tie rod pivotally connected between the upper end of the control portion of the forward control frame and to the rear control frame on an axis coaxial with the pivot axis of the pivotal connection of the draft arms to the implement frame.

2. In combination with a tractor having a pair of rearwardly extended lift arms, a draft hitch for connecting an agricultural implement having a frame to the tractor comprising a bracket plate rigidly mounted on the implement frame having a pair of spaced flanges upwardly extended therefrom and control arm upwardly extended intermediate the flanges; a cantilever frame having opposite side members pivotally connected to the flanges for movement about a substantially horizontal axis and forwardly extended therefrom; a substantially erect lift frame pivotally connected to the forwardly extended ends of the side members of the cantilever frame and upwardly extended therefrom; means pivotally connecting the lift arms to the lift frame below the cantilever frame; a gang attitude control link pivotally connected to the control arm above the connection of the cantilever frame to the flanges and to the lift frame in elevationally spaced substantially parallel relation to the cantilever frame, said pivotal connections of the link to the control arm and to the lift frame being spaced substantially the same as the pivotal connections of the cantilever frame to the flanges and to the lift frame; and a longitudinally adjustable tie pivotally interconnecting the control arm at a position in substantial coaxial alignment with the pivotal interconnection of the cantilever frame to the flanges and the lift frame at a position in elevationally spaced relation to the connection of the gang attitude control link thereto.

3. A hitch structure for an agricultural implement having a predetermined forward direction of earth traversing movement comprising a bracket plate fixedly connected to the implement and having upwardly extended flanges in spaced parallel relation; a pair of elongated arms extended forwardly of the bracket plate having rearward bifurcated ends pivotally connected to the flanges and forward bifurcated ends extended in front of the implement; a substantially erect forward A-frame including a pair of outwardly angulated arms having dependent lugs pivotally connected to the forward bifurcated ends of the arms and upper ends, a shaft extended between the lugs, and a central beam interposed the arms having a lower end pivotally connected to the shaft and an upper end, the central beam being fixedly connected to the upper ends of the arms intermediate the upper and lower ends of the control beam; a rear A-frame including a pair of downwardly divergent arms having lower mounting lugs fixedly connected to the bracket plate intermediate the flanges and upper connecting lugs; a connecting link having a rear end pivotally connected to the connecting lugs of the rear A-frame and a forward end pivotally connected to the central beam of the forward A-frame in substantially parallel relation to the elongated arms, the distance between the pivotal connections of the connecting link and the elongated arms, respectively, to the forward and rearward A-frames being substantially equal; a longitudinally adjustable tie rod including telescoping inner and outer sleeves, the inner sleeve having a forked end straddling the connecting link and pivotally connected to the mounting lugs of the rear A-frame, and a control rod extended through the outer sleeve having one end screw threadably engaged with the inner sleeve and having a crank handle on the opposite end, means pivotally connecting the outer sleeve to the upper end of the forward A-frame, and means connected to the dependent lugs and central beam of the forward A-frame for elevationally adjusting the forward A-frame and forwardly motivating the implement.

4. In combination with a tractor having a pair of rearwardly extended lift arms, a frame mounted in a substantially erect position on the extended ends of the lift arms for forward and rearward tipping thereon, powered means for raising and lowering the lift arms, a control system connected to the powered means, and a link interconnecting the frame and the control system for automatically operating the powered means to raise the lift arms when the frame is tipped forwardly and to lower the lift arms when the frame is tipped rearwardly; a draft hitch for coupling an implement to the frame adapted adjustably to translate draft force of the tractor into regulated components of force exerted elevationally on the implement, comprising a pair of draft arms having forward ends pivotally mounted on the frame for pivotal elevational movement and rearward ends pivotally connected to the implement, a telescopically adjustable link pivotally connected to the implement at a position in substantial alignment with the pivotal connection of the draft arms thereto and pivotally connected to the frame at a position in elevationally spaced relation to the draft arms, a bracket upwardly extended from the implement adjacent to the pivotal connection of the arms and the link thereto, and a substantially rigid member pivotally connected to the bracket and pivotally connected to the frame at a position in elevationally spaced substantially parallel relation to the draft arms.

5. In combination with a tractor having a pair of rearwardly extended lift arms mounted for pivotal movement on the tractor, a frame mounted in a substantially erect position on the extended ends of the lift arms for forward and rearward tipping thereon, powered means for raising and lowering the lift arms, a control system connected to the powered means, and a link interconnecting the frame and the control system for automatically operating the powered means to raise the lift arms when the frame is tipped forwardly and to lower the lift arms when the frame is tipped rearwardly; a draft hitch for coupling a disk harrow having a pair of framed gangs of disks and a center of balance intermediate the gangs adapted adjustably to translate draft force of the tractor into regulated components of force exerted elevationally on the disk harrow, comprising a pair of draft arms having forward ends pivotally connected to the frame above the lift arms for elevational pivotal movement and rearward ends pivotally connected to the disk harrow adjacent to the center of balance thereof, a telescopically adjustable link pivotally connected to the disk harrow adjacent to the center of gravity thereof and pivotally connected to the frame at a position in elevationally spaced relation to the draft arms, a bracket upwardly extended from the disk harrow at a position adjacent to the center of gravity thereof, and a rod pivotally connected to the bracket and pivotally connected to the frame at a position in elevationally spaced substantially parallel relation to the draft arms, the pivotal connection of the rod to the frame being intermediate the pivotal connections of the link and the draft arms to the frame, and the pivotal connections of the rod to the bracket and to the frame being spaced apart substantially the same distance as the spacing of the pivotal connection of the draft arms to the harrow and to the frame.

References Cited in the file of this patent

UNITED STATES PATENTS

| | | |
|---|---|---|
| Re. 22,627 | McKay | Apr. 3, 1945 |
| 1,864,639 | Crezee | June 28, 1932 |
| 2,318,205 | Drennan | May 4, 1943 |
| 2,368,156 | Orelind et al. | Jan. 30, 1945 |
| 2,414,114 | Martin | Jan. 14, 1947 |
| 2,440,550 | Martin | Apr. 27, 1948 |
| 2,456,693 | Fraga | Dec. 21, 1948 |
| 2,527,613 | Zagurski | Oct. 31, 1950 |
| 2,575,622 | Fraga | Nov. 20, 1951 |
| 2,663,240 | Bauer | Dec. 22, 1953 |
| 2,704,018 | Oehler et al. | Mar. 15, 1955 |
| 2,718,183 | Todd | Sept. 20, 1955 |